Patented Mar. 7, 1950

2,499,661

UNITED STATES PATENT OFFICE 2,499,661

QUATERNARY AMMONIUM SALTS OF BIS-QUINOLYLOXY-ω,ω'-ALKANES AND METHOD FOR THEIR PRODUCTION

Daniel Marie Gustave Marcilhacy, Paris, and Raymond Jacques Horclois, Malakoff, France, assignors to Societe des Usines Chimiques Rhone-Poulenc, Paris, France, a French body corporate No Drawing. Application March 5, 1947, Serial No. 732,654. In France July 9, 1946

5 Claims. (Cl. 260—286)

This application is a continuation-in-part of co-pending application Serial No. 713,834, dated December 3, 1946, now abandoned.

This invention relates to new chemical compounds and to processes of producing the same. More particularly, this invention is concerned with new quinoline derivatives which have been found to possess unexpectedly valuable therapeutic application.

The new quinoline derivatives of this invention are quaternary ammonium salts of bis-quinolyloxy-ω,ω'-alkanes in which the alkane chain contains at least two but not more than seven carbon atoms and have muscle-paralysing properties.

Examples of compounds of this type derived from 8-hydroxy-quinoline and having especially useful therapeutic application have the general formula:

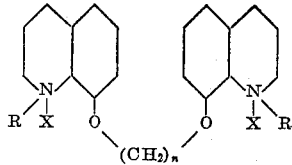

where R represents an alkyl group, X represents a salt-forming anion and $n$ is an integer not less than 2 or greater than 7. The radical R is preferably, though not essentially, a lower alkyl group such as, for example, as methyl, ethyl, n-propyl, isopropyl, butyl, allyl or hexyl, while X preferably, though not essentially, represents a halogen atom such as chlorine, iodine or bromine or an acid residue such as the sulphate anion. The alkane chain may be derived from any alkane containing two to seven carbon atoms such, for example, as ethane, propane, butane, pentane, hexane, or heptane.

Further examples of the new compounds of this invention are those corresponding to the products of the general formula set forth in the last preceding paragraph but derived, not from 8-hydroxy-quinoline, but from the 6-hydroxy compound. Thus in this further group of compounds the ether linkages are in the 6'- and 6''-positions. These compounds have the general formula:

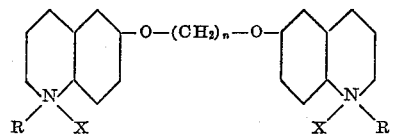

where R represents an alkyl group, X represents a member of the class consisting of halogen and salt forming anions and $n$ is an integer not less than 2 or greater than 7.

Still further examples are compounds of the type defined in the last preceding paragraph and the corresponding compounds containing the ether linkages in the 8'- and 8''-positions wherein the alkane chain is branched viz: instead of being of the form —$(CH_2)_n$— is of the type —$(CR_1R_2)_n$— where the successive $R_1$ and $R_2$ atoms or groups, hydrogen or alkyl respectively, in the chain are the same or are different, an example being the 1-methyl butyl radical.

According to a feature of this invention, the new compounds are obtained by condensing and ω,ω'-dihalogeno-alkane, the chain of which is straight or branched but contains at least two carbon atoms, with an hydroxy-quinoline in an alkaline medium and the resulting di-ether quaternated as, for example, by treatment with an alkyl halide or other convenient ester, for example, sulphate.

The present invention is illustrated by the following examples:

Example I

A mixture of 29 g. of 8-hydroxy-quinoline, 20.2 g. of dibromo-1:3-propane, 20 ccs. of caustic soda (36° Bé.) and 66 ccs. of absolute ethyl alcohol is heated under reflux for 6 hours with agitation. The whole is then poured into 250 ccs. of distilled water and extracted with 100 ccs. of chloroform. The chloroform solution is washed with 50 ccs. of a 2 N solution of caustic soda and the solvent is then removed. 25 ccs. of hydrochloric acid (22° Bé.) and 60 ccs. of ethyl alcohol are then added to the residue. Crystals are formed, which are then filtered off, these crystals consisting of the dihydrochloride of 8':8''-diquinolyloxy-1:3-propane melting at 240° C. (Maquenne block).

The dihydrochloride thus obtained is converted into the corresponding base by basification, extraction with chloroform and evaporation of the solvent. 27 g. of methyl iodide are then added to 5 g. of the isolated base and the mixture then heated in a sealed tube at 100° C. for five hours.

The yellow solid thus obtained is dissolved in 100 ccs. of boiling water, treated with decolourising charcoal and filtered. Upon cooling, the dimethiodide of 8':8''-diquinolyloxy-1:3-propane crystallises out in light yellow crystals, melting at 196° C. (Maquenne block).

There can be prepared in the same way:

The dihydrochloride of 8':8''-diquinolyloxy-1:4-butane (melting point 225° C.) and the corresponding dimethiodide (melting point 250° C.) and diethiodide (melting point 228° C.);

The dihydrochloride of 8':8''-diquinolyloxy-1:5-pentane (melting point 146° C.) and the corresponding dimethiodide (melting point 197° C.), diethiodide (melting point 192° C.) and dibutiodide (melting point 175° C.);

The dihydrochloride of 8':8''-diquinolyloxy-1:6-hexane and the corresponding dimethiodide (melting point 219° C.);

The dihydrochloride of 6':6''-diquinolyloxy-1:5-pentane (melting point 204° C.) and the corresponding diethiodide (melting point 125° C.).

Example II

A mixture of 58 grams of 8-hydroxyquinoline, 43.2 grams of dibromo-1:4-butane, 40 ccs. of sodium hydroxide of 36° Bé. and 120 ccs. of absolute ethyl alcohol is heated under a reflux condenser for 5 hours while stirring. The whole is then poured into 500 ccs. of distilled water and extracted with 200 ccs. of chloroform. The chloroform solution is washed with 100 ccs. of 2 N sodium hydroxide, dried over sodium sulphate, the chloroform is removed and the substance recrystallised from 200 ccs. of ethyl acetate and 100 ccs. of ethyl alcohol. There is thus obtained 8':8''-diquinolyloxy-1:4-butane melting at 130° C.

13.8 grams of this base are then heated with 27.2 grams of isopropyl iodide at 100° C. for 24 hours, the excess isopropyl iodide is removed and the product is recrystallised from 250 ccs. of methyl alcohol. The isopropiodide of 8':8''-diquinolyloxy-1:4-butane is obtained, melting at 219° C.

By replacing the isopropyl iodide of this example by n-propyl iodide, the di-n-propiodide of 8':8''-diquinolyloxy-1:4-butane melting at 232-233° C. is obtained.

The di-butiodide melting at 192° C. is obtained in the same way.

Example III

Starting from 8':8''-diquinolyloxy-1:3-propane (obtained from 8-hydroxyquinoline and dibromo-1:3-propane) the following are prepared by the method of Example I or Example II:
 The di-methiodide melting at 275° C.
 The di-n-propiodide, melting at 236° C.
 The di-isopropiodide, melting at 129° C.
 The di-butiodide, melting at 159° C.

Example IV

Starting from 8':8''-diquinolyloxy-1:5-pentane, the following are prepared by the method of the preceding example:
 The di-n-propiodide, melting at 180° C.
 The di-isopropiodide, melting at 220° C.
 The di-allyliodide, melting at 180° C.

Example V

Starting from 8':8''-diquinolyloxy-1:6-hexane, the following are prepared:
 The di-ethiodide, melting at 236° C.
 The di-n-propiodide, melting at 190° C.
 The di-isopropiodide, melting at 199° C.
 The di-butiodide, melting at 178° C.
 The di-hexyl bromide, melting at 158° C.

Example VI

The di-ethiodide of 8':8''-diquinolyloxy-1:7-heptane, melting at 129° C. is prepared in a similar manner.

Example VII

Starting from 6':6''-diquinolyloxy-1:3-propane (obtained from 6-hydroxyquinoline and dibromo-1-3-propane) the di-butiodide, melting at 194° C. is prepared.

Example VIII

Starting from 6':6''-diquinolyloxy-1:4-butane, the following are prepared:
 The di-methiodide, melting at 298° C.
 The di-ethiodide, melting at 179° C.
 The di-n-propiodide, melting at 150° C.
 The di-isopropiodide, melting at 152° C.
 The di-butiodide, melting at 114° C.

Example IX

Starting from 6':6''-diquinolyloxy-1:5-pentane, the following are prepared:
 The di-methiodide, melting at 235° C.
 The di-n-propiodide, melting at 115° C.
 The di-isopropiodide, melting at 108° C.
 The di-butiodide, melting at 146° C.

Example X

Starting from 6':6''-diquinolyloxy-1:6-hexane, the following are prepared:
 The di-ethiodide, melting at 128–130° C.
 The di-isopropiodide, melting at 112° C.
 The di-butiodide, melting at 192° C.

Example XI

Sodium ethylate is prepared from 1.2 grams of sodium and 50 ccs. of absolute ethyl alcohol; 7.5 grams of 6-hydroxyquinoline are then added thereto. The liquid is boiled for 10 minutes, then 5.7 grams of dibromo-1:4-pentane are poured in gradually during half-an-hour. The product is heated under a reflux for 4 hours. It is taken up with 100 ccs. of water and 50 ccs. of chloroform. It is extracted again with 25 ccs. of chloroform and the chloroform solution is washed first with 100 ccs. of N sodium hydroxide, and then with 100 ccs. of water. The product is dried over sodium sulphate and the chloroform is expelled on the waterbath.

The crude base thus obtained is heated for 6 hours on the waterbath with 26 grams of ethyl iodide. The product is taken up with 100 cc. of boiling water, treated with carbon and filtered hot. On cooling, there are obtained crystals of the di-ethiodide of 6':6''-diquinolyloxy-1:4-methyl-1-butane, which melts at 134° C.

Example XII

The dihydrobromide of 8':8''-diquinolyloxy-1:4-methyl-1-butane is obtained by heating 8-hydroxyquinoline with 1:4-dibromo-pentane. By liberating the base and condensing with ethyl iodide, the di-ethiodide of 8':8''-diquinolyloxy-1:4-methyl-1-butane, melting at 116° C. is obtained.

We claim:
1. A compound of the general formula:

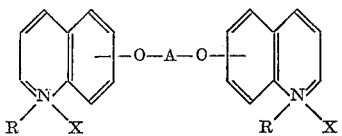

where R is an alkyl group, X is a halogen atom, A is a divalent aliphatic chain containing at least 2 and not more than 7 carbon atoms, and the grouping —O—A—O— is linked to the quinoline nuclei in positions selected from the group consisting of the 6':6''- and 8':8''- positions, the quinoline nuclei being otherwise unsubstituted.

2. A compound of the general formula:

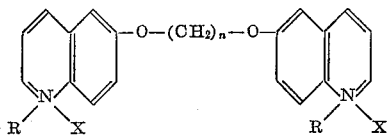

where R is an alkyl group, X is a halogen, $n$ is an integer selected from the class consisting of 2, 3, 4, 5, 6 and 7, and the quinoline nuclei are otherwise unsubstituted.

3. A compound of the general formula:

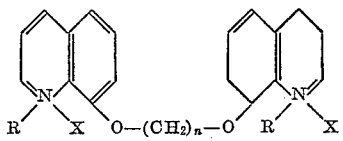

where R is an alkyl group, X is a halogen atom, $n$ is an integer selected from the class consisting of 2, 3, 4, 5, 6 and 7, and the quinoline nuclei are otherwise unsubstituted.

4. A di-quaternary ammonium halide of 8':8''-diquinolyloxy-1:5-pentane.

5. A process for the preparation of a compound of the general formula:

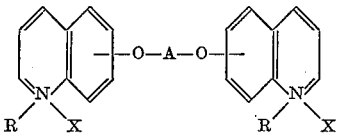

where R is an alkyl group, X is a halogen atom, A is a divalent aliphatic chain containing at least 2 and not more than 7 carbon atoms, and the grouping —O—A—O— is linked to the quinoline nuclei in positions selected from the group consisting of the 6':6''- and 8':8''- positions, the quinoline nuclei being otherwise unsubstituted, which comprises condensing a compound selected from the class consisting of 6-hydroxyquinoline and 8-hydroxyquinoline, in an alkaline medium, with a dihalogeno alkane containing at least two carbon atoms and converting the bis-quinolyloxy alkane thus obtained into the corresponding quaternary ammonium dihalide.

DANIEL MARIE GUSTAVE MARCILHACY.
RAYMOND JACQUES HORCLOIS.

REFERENCES CITED

The following references are of record in the file of this patent:

UNITED STATES PATENTS

| Number | Name | Date |
|---|---|---|
| 2,068,824 | Schonhofer et al. | Jan. 26, 1937 |
| 2,228,166 | Jensch | Jan. 7, 1941 |